April 18, 1961  S. MACOMBER  2,979,806
METHOD OF MAKING LAMINATED TUBULAR
SECTION STRUCTURAL MEMBERS
Original Filed Feb. 7, 1958  3 Sheets-Sheet 2
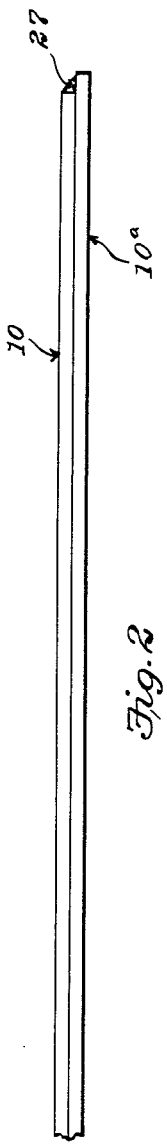
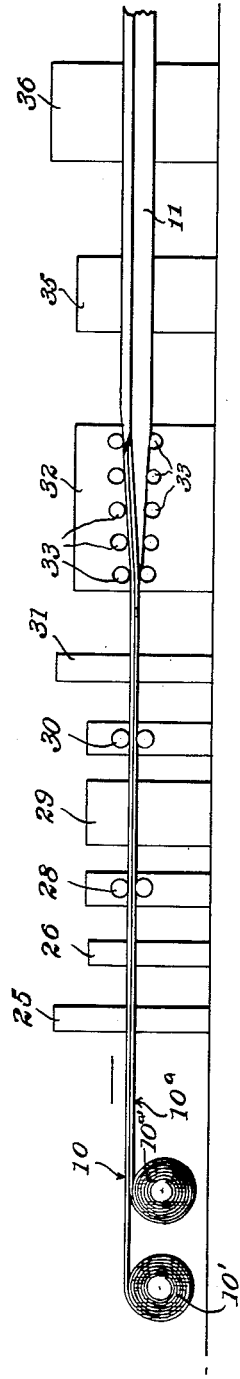
INVENTOR
Stanley Macomber
BY Frease & Bishop
ATTORNEYS April 18, 1961 S. MACOMBER 2,979,806
METHOD OF MAKING LAMINATED TUBULAR
SECTION STRUCTURAL MEMBERS
Original Filed Feb. 7, 1958 3 Sheets-Sheet 3
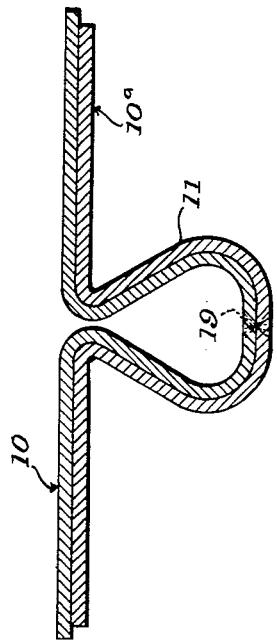
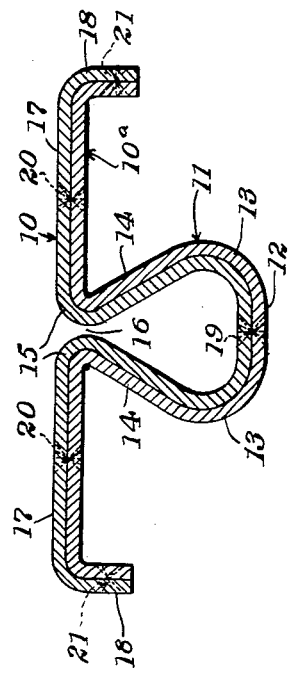
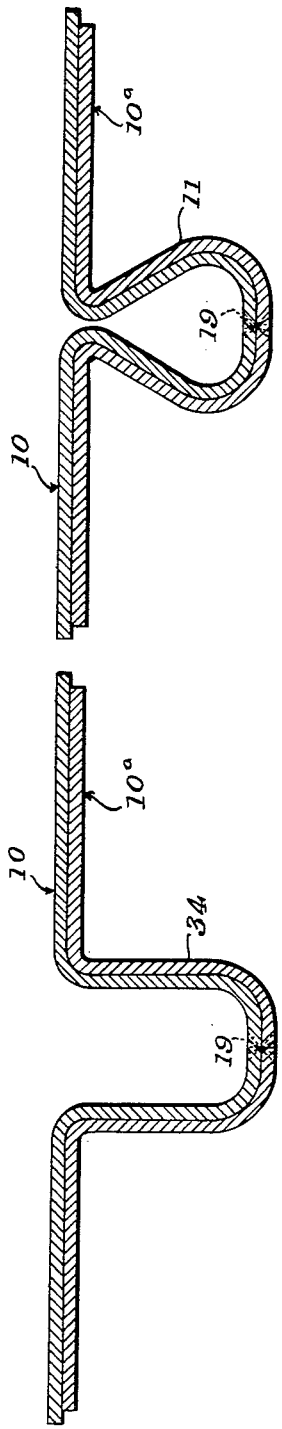
INVENTOR
Stanley Macomber
BY Frease & Bishop
ATTORNEYS

United States Patent Office 2,979,806
Patented Apr. 18, 1961

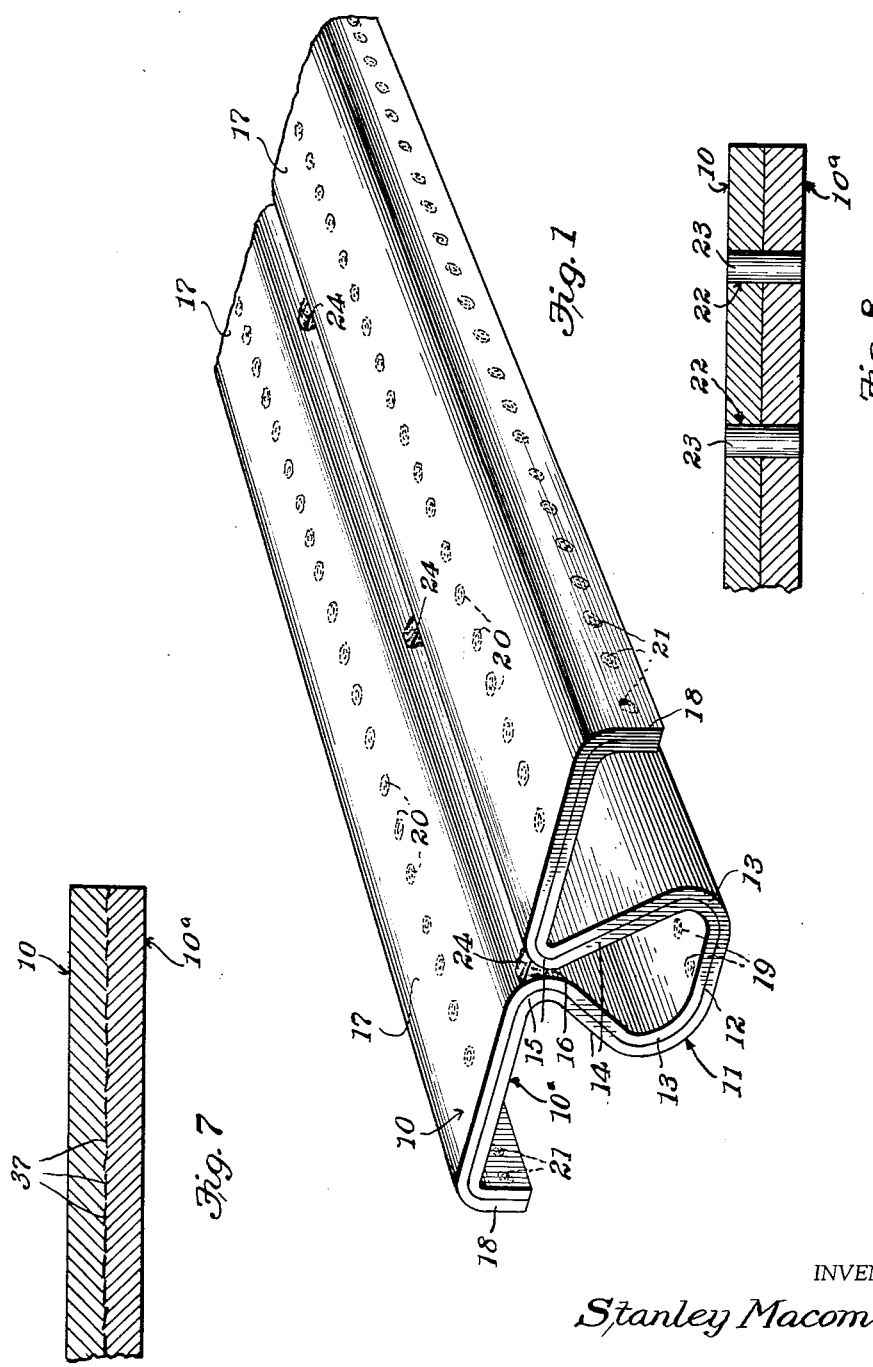

2,979,806

METHOD OF MAKING LAMINATED TUBULAR SECTION STRUCTURAL MEMBERS

Stanley Macomber, Canton, Ohio, assignor to Macomber, Incorporated, Canton, Ohio, a corporation of Ohio Original application Feb. 7, 1958, Ser. No. 713,810. Divided and this application Nov. 25, 1958, Ser. No. 776,287

6 Claims. (Cl. 29—155)

The invention relates to a method of forming laminated tubular section structural members, and the present application is a division of my copending application, Serial No. 713,810, filed February 7, 1958.

Single ply tubular section structural members of the type referred to have been made for many years in accordance with my Patent No. 2,457,250, issued December 28, 1948. Such a structural member comprises an elongated strip of metal having its longitudinal central portion bent into a substantially triangular tubular "bulb," opposite edge portions of the strip being oppositely bent forming substantially flat flanges.

The dimensions of such structural members are limited by the gauge of the steel strips from which they are formed. For instance, permissible flange widths are limited to slightly over twenty times the gauge of the steel strip, and this requires that the terminal edges of the flanges be reinforced with downturned lips.

Originally, such tubular section structural members were made in gauges from 0.060″ to a maximum gauge of 0.160″, with a "bulb" of 1¼″ height. Since a deeper bulb permits practical utilization of heavier gauge steel, a 3-inch deep section was later developed using a maximum gauge of 0.230″. This is the heaviest gauge in the hot rolled sheet classification, and also, for all practical purposes is the heaviest gauge sheet which may be coiled and uncoiled as is desirable in the manufacture of such structural members.

Thus, in the 3-inch deep "V-section" as compared with the original 1¼″ section, applicant gained not only the additional area in the "bulb" as a result of increased depth and heavier gauge, but also gained a wider flange allowance due to the heavier gauge metal used in the fabrication thereof.

Such tubular, or "V-section," structural members are commonly utilized as chords in fabricated steel joists, beams, girders and other fabricated structural members in which spaced top and bottom chords are connected by an intervening open-web system. It will be evident that the capacity of such fabricated members is limited by the maximum dimensions, strength and capacity of the "V-sections" utilized as chords therein.

Therefore, these 3-inch deep "V-sections" are not suitable for use as chords in extremely long trusses, girders, beams, long-span joists and similar large heavy fabricated structural members.

It is therefore an object of the invention to provide a novel and efficient method of forming tubular of "V-section" structural members formed of hot rolled sheet strip material, of sufficient capacity for use as chords in such large heavy fabricated structural members.

Another object of the invention is to provide a method for forming a laminated tubular structural member which will permit doubling in structural effect the maximum gauge of hot-rolled sheet available, by combining two superposed strips of up to 0.230″ gauge, giving a combined overall gauge of up to 0.460″.

A further object of the invention is to provide a method for making such a laminated tubular section structural member in which the plural strips of metal are connected together by spot-resistance welding, punching and plugging, or other practical means.

A still further object of the invention is to provide a method for making such laminated tubular section structural members, which includes connecting the laminations together at the longitudinal center line and at lines running longitudinally through the flanges of the section.

Another object of the invention is to provide a method of the character referred to, in which two superposed hot-rolled strips are connected together at their leading ends and then passed longitudinally through suitable forming apparatus.

A further object is to provide such a method in which the two strips are connected together at their longitudinal center line, then formed to desired "V-section" shape, and then connected together in the flange portions of the finished structural member.

The above objects together with others which will be apparent from the drawings and following description, or which may be later referred to, may be attained by constructing the improved laminated tubular section structural member in the manner hereinafter described in detail and illustrated in the accompanying drawings.

In general terms, the invention may be described as comprising a laminated tubular section structural member comprising two juxtaposed hot rolled steel strips connected together by welding, or punching and plugging, the longitudinal central portion of the united strips being formed into substantially triangular tubular or "bulb" shape, with oppositely disposed flat flanges at the top of the "bulb" and terminating in downturned edges.

A longitudinal nailing groove is formed at the top or apex of the triangular "bulb" and welds are located at spaced points therein to hold the groove to a predetermined definite width.

In forming the laminated "V-section" structural member, two hot rolled steel strips are superposed and the leading ends thereof are welded together. The laminated strip structure is then moved longitudinally forward through side guides, and the two strips are connected together along their longitudinal center line by welding, punching and plugging, or the like.

The two superposed connected strips are then passed forwardly through forming rolls which form the longitudinal central portion thereof into a substantially triangular tubular "bulb" with a longitudinal groove at its top or apex, and the edge portions are bent oppositely to form oppositely disposed flat flanges with downturned terminal edges. The flanges are connected together throughout their lengths by welding, punching and plugging, or the like.

Having thus briefly described the laminated tubular sectional structural member to which the invention pertains, and the method of making the same, reference is now made to the accompanying drawings, in which:

Fig. 1 is a perspective view of a portion of a laminated tubular section structural member embodying the invention;

Fig. 2 is a longitudinal edge elevation of two superposed hot rolled steel strips having their leading ends welded together preparatory to forming a laminated tubular section structural member;

Fig. 3 is a transverse sectional view through two superposed hot rolled steel strips connected at the center line preparatory to being formed into the laminated structural member to which the invention pertains;

Fig. 4 is a transverse sectional view through the superposed connected strips after an initial forming operation;

Fig. 5 is a similar view after the triangular tubular "bulb" has been formed;

Fig. 6 is a transverse sectional view through the completed laminated tubular section structural member;

Fig. 7 is an enlarged, fragmentary, longitudinal sectional view through a portion of the completed structural member showing the manner in which mill scale is imbedded between the superposed sheets;

Fig. 8 is an enlarged, fragmentary, sectional view showing an alternative method of connecting the two sheets together by punching and plugging; and, Fig. 9 is a diagrammatic view showing the method by which the laminated structural member is formed.

The laminated tubular section structural member, as best shown in Figs. 1 and 6, is formed of two hot rolled steel strips, the combined thicknesses of which may be between 0.230 inch and 0.460 inch. Either one, or both, of the strips forming the laminated structural member may be of a maximum gauge of 0.230 inch. The two strips forming the structural member are indicated generally at 10 and 10a.

The longitudinal central portion of the laminated strips is formed into a substantially triangular tubular portion or "bulb" as indicated at 11. This tubular portion or "bulb" comprises the flat bottom wall 12, connected through the curved bends 13 at each side with the upwardly converging, substantially flat side walls 14 having the spaced, oppositely curved, rounded bends 15 at the apex of the triangle, forming a longitudinal slot 16 at the top of the structural member.

The laminated strips are then bent outwardly in opposite directions from the slot 16 forming the oppositely disposed lateral flat flanges 17 located in a plane parallel with the flat bottom wall 12 of the "bulb." The terminal edges of the flanges 17 are bent downwardly, preferably at 90° as indicated at 18, to stiffen and reinforce the structural member.

The two strips 10 and 10a are connected together at the longitudinal center line, as indicated at 19, and longitudinally through the flanges, as indicated at 20 and 21, as by spot-resistance welding. If desired, the strips 10 and 10a may be connected together by punching as at 22 and plugs shown at 23 in Fig. 8, or by any other usual and well known means.

For the purpose of holding the width of the slot or groove 16 to a definite spacing, as well as to assist in stiffening and reinforcing the laminated structural member, and holding it rigidly in the formed condition, welds as indicated at 24 may be located at spaced intervals in the entrance to the slot or groove 16.

In such a laminated tubular section structural member, owing to the increased thickness of the combined strips 10 and 10a of which the structural member is formed, the bulb 11 of the structural member may be of considerably greater depth than is possible under present practice.

The flange width may also be considerably increased over present practice and may be slightly over 20 times the combined gauge of the two strips 10 and 10a. The structural effect and capacity of such a laminated tubular section structural member may thus be greatly increased over present practice, wherein the structural members are formed of a single hot rolled strip with a maximum gauge of 0.230 inch.

By using two hot rolled strips 10 and 10a, each of the maximum gauge of 0.230 inch, an overall gauge of 0.460 inch is provided which would permit doubling in structural effect the maximum gauge of hot rolled sheet available.

Thus, large heavy tubular section structural members may be produced which will be suitable for use as chord members in large heavy fabricated structural members for carrying extremely heavy loads, such as trusses, girders, beams, long-span joists and the like.

In Fig. 9 is shown diagrammatically the manner in which a laminated tubular section structural member may be formed from two hot rolled steel strips, one or both of which may be of a maximum gauge of 0.230 inch, giving an overall maximum gauge of 0.460 inch.

Coils of the hot rolled strip as indicated at 10' and 10a' are located in suitable coil boxes at the charging end of the apparatus diagrammatically shown in Fig. 9. The strips 10 and 10a are withdrawn from the coils 10' and 10a' respectively, and are placed in superposed position and passed through the side guides, indicated generally at 25, to a clamp stand 26 where the leading ends of the two strips are arc-welded together as indicated at 27 in Fig. 2.

It will be understood that each of the strips 10 and 10a may be up to a maximum gauge of 0.230 inch. The upper strip 10 should be of somewhat greater width than the lower strip 10a, as shown in Fig. 3, in order to compensate for the lateral movement of the strips relative to each other during the forming operation, so that the lateral edges of the strips may be flush when the laminated tubular section structural member is completed.

The two strips 10 and 10a, with the leading ends thereof welded together as at 27, are then entered into the power rolls, indicated generally at 28 which advances the superposed strips through the forming mechanism.

After passing through power rolls 28, the superposed strips pass through the sliding center line connector indicated generally at 29, in which the two strips are connected together at the longitudinal center line as by spot-resistance welding, as indicated at 19. Instead of spot-resistance welding, the two hot rolled strips 10 and 10a may be connected together at this point by punching and plugging as shown in Fig. 8, or by other practical method.

After being thus connected together at the center line, the two superposed, connected strips 10 and 10a then pass through additional power rolls 30 and side guides 31 and then into the forming mill indicated generally at 32. This forming mill includes a plurality of forming rolls 33 which form the superposed strips 10 and 10a, progressively as shown in Figs. 4, 5 and 6.

First, the longitudinal central portion of the combined strips is formed into substantially U-shape as indicated at 34 in Fig. 4, after which the upper ends of the U are bent toward each other forming the substantially triangular bulb 11, as shown in Fig. 5. The terminal edges of the combined strips are then bent down forming the terminal flanges 18, as shown in Fig. 6.

The formed laminated tubular section structural member then passes through the sliding flange connector indicated generally at 35 where the superposed strips are welded together longitudinally throughout the flange portions 17 and 18, as indicated at 20 and 21 respectively in Figs. 1 and 6. The finished structural member then passes through the sliding cut-off shear indicated generally at 36, where it may be cut into any desired length.

As the laminated tubular section structural member is formed of hot rolled strips, mill scale will be loosened upon the strips by the cold roll forming operation. Such scale will be retained between the opposed surfaces of the strips 10 and 10a within the structural member thus formed.

Since the scale is harder than the steel strips, there will be a tendency for the scale to become slightly imbedded in the opposed surfaces of the strips 10 and 10a, as indicated at 37 in Fig. 7. The scale will thus prove resistant to longitudinal slippage between the two strips in the finished structural members when used as chords in fabricated truss members when they are under heavy loadings.

It has been found by actual practice that a laminated structural member of any given total thickness may be roll formed with much less power than a single-ply structural member of the same given thickness.

Therefore, while the laminated structural member was developed in order to produce larger and heavier structural members than the single-ply structural members of present practice, the invention is not limited to such large, heavy structural members, but includes the laminated structural members formed from a plurality of sheets of gauges in the hot rolled sheet classification, regardless of the combined thickness of the laminations.

Thus, while for the purpose of illustration, the structural member is shown as formed of only two hot-rolled sheets, it should be understood that the laminated structural member may be formed from two or more hot-rolled sheets.

From the above it will be seen that the laminated tubular section structural member constructed in the manner herein disclosed may be of greatly increased capacity. Such laminated structural members may be of considerably greater depth than is possible under present practice where such members are formed from a single thickness of hot-rolled strip, and the flange width may greatly exceed the maximum flange width under present practice.

It will also be evident that these laminated structural members are formed of hot-rolled strips which may be coiled and uncoiled as is necessary and desirable in the manufacture of such products.

It will also be seen that the laminated structural member may be formed to desired shape with considerably less power than would be required in the bending and forming a a single-ply steel plate of a gauge equal to the combined thicknesses of the two steel strips from which the laminated structural member is formed.

Laminated structural members made in this manner would be suitable for use as chords in heavy trusses, girders, beams and long-span joists for which purposes the single-ply V-sections of present practice cannot be used. This is possible because the laminated structural member permits doubling in structural effect the maximum gauge of hot rolled steel sheet available.

It will also be evident that this laminated structural member functions without slippage between the two strips of which it is formed when submitted to maximum moment stresses under loading of built-up truss members or the like in which the laminated structural members form the chords.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The method of making a laminated tubular section structural member which comprises moving two strips of hot-rolled sheet steel longitudinally in superposed relationship with the edges of the lower strip spaced inwardly from the edges of the upper strip, connecting the leading ends of the two strips together, connecting the moving strips together at the longitudinal center line so that they are free to move relatively only from the longitudinal center outward, then roll forming the longitudinal central portion intermediate the longitudinal edges of the moving composite strip downwardly into U-shape, then roll forming the U-shape central portion intermediate the longitudinal edges of the moving composite strip into tubular form with a longitudinal groove in the top side thereof, then bending the moving composite strip oppositely on each side of the groove forming flat flanges with downturned terminal portions with the edges of both strips flush, then connecting the flanges and downturned terminal portions of the two strips together longitudinally throughout the length of said structural member, and deposit welding at spaced points in the entrance to the groove for rigidly holding the walls thereof to a predetermined spacing.

2. The method of making a laminated tubular section structural member as defined in claim 1, in which the two strips are connected together by welding.

3. The method of making a laminated tubular section structural member as defined in claim 2, in which the U-shape central portion of the composite strip is roll formed into triangular tubular form with the longitudinal groove in the apex thereof.

4. The method of making a laminated tubular section structural member as defined in claim 1, in which the two strips are connected together by punching and plugging.

5. The method of making a laminated tubular section structural member as defined in claim 4, in which the U-shape central portion of the composite strip is roll formed into triangular tubular form with the longitudinal groove in the apex thereof.

6. The method of making a laminated tubular section structural member as defined in claim 1, in which the U-shape central portion of the composite strip is roll formed into triangular tubular form with the longitudinal groove in the apex thereof.

References Cited in the file of this patent

UNITED STATES PATENTS

| | | |
|---|---|---|
| 1,840,305 | Andrus et al. | Jan. 12, 1932 |
| 2,086,143 | Van Huffel | July 6, 1937 |
| 2,326,283 | Bonsall | Aug. 10, 1943 |
| 2,457,250 | Macomber | Dec. 28, 1948 |

FOREIGN PATENTS

| | | |
|---|---|---|
| 582,387 | Germany | Aug. 14, 1933 |